United States Patent
Norville (10) Patent No.: US 8,580,346 B2
(45) Date of Patent: Nov. 12, 2013

(54) COMPOSITIONS AND METHODS FOR RESTORING AIRCRAFT WINDOWS AND OTHER PLASTIC SURFACES

(75) Inventor: William C. Norville, San Diego, CA (US)

(73) Assignee: PCW Holdings, LLC, Las Vegas, NV (US)

( * ) Notice: Subject to any disclaimer, the term of this patent is extended or adjusted under 35 U.S.C. 154(b) by 401 days.

(21) Appl. No.: 13/080,202

(22) Filed: Apr. 5, 2011

(65) Prior Publication Data

US 2011/0189386 A1 Aug. 4, 2011

Related U.S. Application Data

(63) Continuation-in-part of application No. 11/952,831, filed on Dec. 7, 2007, and a continuation-in-part of application No. 13/070,979, filed on Mar. 24, 2011, now abandoned.

(51) Int. Cl.
*B05D 3/12* (2006.01)

(52) U.S. Cl.
USPC .......................................... 427/307; 51/295

(58) Field of Classification Search
USPC .......................................... 427/307; 51/295
See application file for complete search history.

(56) References Cited

U.S. PATENT DOCUMENTS

| | | | |
|---|---|---|---|
| 5,039,311 A * | 8/1991 | Bloecher | 51/295 |
| 5,334,335 A * | 8/1994 | Norville | 264/36.1 |
| 5,337,524 A | 8/1994 | Norville | |
| 5,407,615 A | 4/1995 | Norville | |
| 5,865,902 A * | 2/1999 | Yam et al. | 134/7 |
| 5,913,716 A | 6/1999 | Mucci | |
| 6,835,120 B1 | 12/2004 | Matsui | |
| 7,163,446 B1 | 1/2007 | Cole | |
| 7,404,988 B2 | 7/2008 | Kuta | |
| 2002/0090891 A1 | 7/2002 | Adefris | |
| 2005/0159325 A1* | 7/2005 | Maillie | 510/243 |
| 2005/0208210 A1 | 9/2005 | Kuta | |
| 2006/0201605 A1 | 9/2006 | Shadwell | |
| 2009/0098806 A1 | 4/2009 | Lobmeyer | |
| 2009/0148606 A1 | 6/2009 | Norville | |

FOREIGN PATENT DOCUMENTS

| | | |
|---|---|---|
| EP | 0650803 | 5/1995 |
| JP | 2002050215 | 2/2002 |

OTHER PUBLICATIONS

Whitney, T., Characterization of Clearfix Process for Stretched Acrylic, University of Dayton Research Institute, Nov. 1, 1995.
U.S. Appl. No. 11/952,831, Dec. 22, 2010, Office Action.
U.S. Appl. No. 11/952,831, Apr. 12, 2011, Office Action.

* cited by examiner

*Primary Examiner* — Timothy Meeks
*Assistant Examiner* — Nathan T Leong
(74) *Attorney, Agent, or Firm* — Workman Nydegger (57) ABSTRACT

Plastic restoration kits and methods for effectively restoring the light transmission and optical clarity properties to a plastic surface such as an aircraft window. The kits and methods restore plastic surfaces that have been damaged by scratching and/or UV-induced oxidation. The kits and methods employ a polishing composition and optionally a lusterizing composition, each having particles selected so as to polish and lusterize a plastic surface. After polishing and lusterizing, a UV protective composition that forms a hard UV protective coating is applied. The polishing and/or lusterizing compositions may include agglomerated abrasive particles dispersed in a liquid or gel carrier that progressively break down in size when exposed to oxygen and mechanical pressuring during polishing or lusterizing.

25 Claims, 5 Drawing Sheets

COMPOSITIONS AND METHODS FOR RESTORING AIRCRAFT WINDOWS AND OTHER PLASTIC SURFACES

CROSS-REFERENCE TO RELATED APPLICATIONS

The present application is a continuation in part of copending U.S. patent application Ser. No. 13/070,979 filed Mar. 24, 2011 and entitled COMPOSITIONS AND METHODS FOR RESTORING AIRCRAFT WINDOWS AND OTHER PLASTIC SURFACES, which is a continuation in part of copending U.S. patent application Ser. No. 11/952,831, filed Dec. 7, 2007 and entitled "COMPOSITIONS AND METHOD FOR RESTORING PLASTIC COVERS AND LENSES", the disclosure of which is incorporated by reference in its entirety.

BACKGROUND OF THE INVENTION

1. The Field of the Invention

The present invention is directed to restoring clarity and optics to plastic surfaces (e.g., aircraft windows). In particular, the present invention is directed to compositions and methods for removing scratches and oxidative damage from plastic surfaces including plastic aircraft windows, plastic covers (e.g., headlight covers), lenses, optical lenses, sighting mechanisms, and other plastic surfaces. Embodiments of the invention further have the ability to prevent further damage due to hazing, scratching, and oxidation so as to extend the life expectancy of such surfaces.

2. The Relevant Technology

Plastic materials have largely replaced glass as an optically transparent and safe covering for most all aircraft windows and canopies due to their light weight, strength, and because the window may comprise a molded polycarbonate plastic that is formed into an aerodynamic shape that fits the profile of the aircraft opening at a fraction of the weight of its glass counterpart. Such plastic materials have also replaced other objects that were once formed of glass. For example, headlight covers of typical late model vehicles are also formed of plastic (e.g., polycarbonate), rather than glass. A typical plastic headlight cover is composed of a molded polycarbonate plastic that is formed into an aerodynamic shape that fits the profile of the front of the automobile.

Plastics are superior to glass in a number of respects. Plastics are lighter than glass while having similar clarity, they are more flexible and able to absorb small impacts, and they are much less likely to shatter in response to large impacts. In addition, plastics can readily be molded into a variety of aerodynamic shapes that are more compatible with modern aircraft and automotive design.

Plastics, however, present a number of disadvantages. For example, they are prone to scratching, hazing, and UV-induced oxidative damage. And while plastic aircraft windows and headlight covers are typically endowed with coatings that protect against scratching and UV damage, such coatings do not provide 100% protection over time. For example, airborne particles, road particles, and other hard, abrasive substances can penetrate the protective coating and cause scratching that degrades the optical properties of the plastic. In addition to physically degrading the optical properties of the plastic surface, scratching leads to a number of other processes that can damage the plastic. For example, scratches (from washing and cleaning the surface) that penetrate the protective coating can allow access to the plastic substrate by exhaust emissions and the chemicals in acid rain. Similarly, scratches that penetrate the protective coating typically present on such surfaces also allow access to the underlying plastic substrate. In addition, heating of the aircraft window by the sun can cause hazing and scratches to expand and contract, allowing greater access to the plastic substrate for UV radiation, oxygen, and/or other environmental constituents. Over time, if these processes are left unchecked, plastic aircraft windows, as well as headlight covers and other plastic surfaces can become hazy and almost opaque, reducing the clarity and optical qualities of the window or cover.

In the case of headlights, the lumens, or light output transmitted through the cover can be greatly reduced. This naturally creates a safety issue due to reduced headlight intensity and effectiveness. For example, reduced headlight intensity can result in an inability to effectively see the road ahead and an inability to be seen by others. For example, an object or person on an unlit road may only be seen at about 50 feet rather than the over 200 feet that would be typical with a new headlight cover, making it difficult to brake in time. In addition, such damaged headlight covers diffuse the light output from the headlight, causing diffused glare to oncoming drivers.

In the case of aircraft windows, it can be difficult for pilots or passengers to see effectively through such damaged plastic windows especially when flying into the sun, creating a safety hazard for pilots as well as crew of military and emergency aircraft.

Replacement is one option. In the case of aircraft, the cost of such aircraft windows can run anywhere from $1,000 to $75,000 per window, which does not account for labor and aircraft down time. Such incidental costs for the military and airlines can be even more significant than the price of the window. Similarly, headlight covers that have been badly damaged by hazing, scratching and/or oxidation can be replaced, but at a relatively high cost. Replacing the plastic covers can be cost prohibitive for many consumers. For example, the typical cost for replacing headlight covers on a car can run anywhere between $300 to $1,500 per headlight, not including installation costs.

There are products that are available that purport to restore plastic surfaces. Most of these products, however, use sand paper, harsh cleaners or processes, cheap waxes, and metal polish intended for other applications. These products can be very detrimental to the fragile clarity and optical characteristics of the plastic surface. Also, whatever benefit is derived from these products is often short lived, as the uncoated plastic surface will quickly become crazed when again exposed to environmental forces.

One example of a product that has been used to remove scratches from plastic surfaces is a system called Micro-Mesh™. Another is available from 3M. Both of these use different varieties of sand paper or sanding discs. The Micro-Mesh™ and 3M systems remove scratches from plastics using a series of rubber-backed sanding cloths or discs with differing sizes of grit. The first series of Micro-Mesh™ steps uses a rubber backed sanding cloth having 8 different grits starting at 2,400 grit. In subsequent steps, sanding cloths of finer grades up to 12,000 gauge grit are used. In addition to using the rubber sanding block, a small amount of antistatic cream is applied after polishing is complete. The 3M system uses sanding discs applied with an air tool followed by an oil based compound or polish. The main problem with these systems is that they both require a very skilled technician to perform the procedure properly.

Such systems have many negative aspects. One negative aspect is that without a skilled technician, the process results in optical distortions because a large amount of plastic must be sanded away in order to remove even the tiniest of scratches. That is, it is necessary to remove enough of the plastic surface to at least equal the depth of the scratch in an even pattern of up, down, and side-to-side motions, known as "cross-hatching". Once this is done, the optics and clarity of the plastic must be restored, although a major problem is that whenever a sizable area of plastic is removed, a much larger portion of the window surrounding the scratch must also be polished out in order to avoid optical distortion of the plastic in the surrounding area where the scratch was removed. To avoid optical distortion, the user must possess a high level of skill and patience, which requires a high amount of training. Such a high level of training is a practical impossibility with a constant turnover of personnel (e.g., as in the military).

Moreover, repeated scratch removals using this system will greatly reduce the thickness of the plastic and destroy its desired protective properties. In the case of pressurized aircraft, there are minimum thickness requirements for airworthiness. One or perhaps two of these sandings may be sufficient to render the window to thin to meet the standard, requiring expensive replacement. Another negative aspect of existing sanding system is the large amount of time it takes to perform each of the series of sandings for each type of grit. Yet another negative aspect of such systems is that extensive sanding removes any protective UV or other specialty coating from the plastic along with the scratches intended to be removed. Many plastic aircraft windows and lenses include such specialty coatings, which should be preserved if at all possible.

With respect to aircraft windows, another system known as the Plastec EZ Clear system uses an oil based polishing compound to finish the process. Because the polish includes oil, it results in a plastic surface that appears clear and scratch free, but once the window is washed once or twice with soap and water the oil residue is lost, and the scratches and hazing from the grit of the polishing compounds become visible again.

With respect to headlight cover repair systems, many other products use varnishes or clear coatings, such as acrylic spar varnish, to essentially fill in and cover scratches in plastic head light cover. These products are easy and quick to use, but they ultimately do not restore the plastic. A coat of varnish merely covers the scratching and oxidation and does nothing to repair the underlying damage to the plastic. Varnishes and paint generally do not adhere to plastic very well and the varnish is likely to flake off in a short period of time. Moreover, if the refractive index of the varnish coating is dissimilar to that of the underling plastic, each of the filled in scratches will act as a micro lens scattering the light from the headlight. Such a result diffuses the light output so that no real improvement in the problem is achieved. While the headlight may look better after applying the coat of varnish, the varnish will not in fact restore the clarity or optical properties of the cover.

Scratching and oxidation damage to various types of plastic surfaces presents an ongoing problem. In the case of plastic aircraft windows, such damage presents an important safety hazard to pilots and other crew of emergency and military aircraft, and while it may simply be thought of as annoying to passengers on commercial aircraft, a need exists for systems and methods for better restoring such plastic surfaces.

BRIEF SUMMARY OF THE INVENTION

The present invention encompasses novel compositions and methods configured to restore the clarity, optics, and light transmission properties of a plastic surface that has been damaged by scratching and ultraviolet induced oxidation. It has been found that such imperfections or flaws in the surface of the plastic can be removed by applying to the plastic surface renewal compositions described herein. The compositions may include, for example, one or more polishing compositions for removing scratches and oxidation from a plastic surface, optionally one or more lusterizing compositions for further smoothing the polished plastic surface and restoring luster, and one or more compositions for restoring UV protection to the plastic surface. Restoring a plastic surface according to the present invention provides long-lasting clarity, light transmission, and a UV protective finish.

The polishing compositions may include an abrasive material having an initial grit size in a range of about 50 microns to about 400 microns, preferably in a range of about 60 microns to about 300 microns, and more preferably in a range of about 70 microns to about 200 microns, and most preferably in a range of about 75 microns to about 150 microns. A medium grit polishing composition preferably has an initial grit size of about 50-100 microns, preferably about 60-90 microns, and a heavy grit polishing composition preferably has an initial grit size in a range of about 80-200 microns, preferably about 100-150 microns. The abrasive material is dispersed within an appropriate carrier suitable for use in making polishing compositions. According to one embodiment, the abrasive material in the polishing composition comprises abrasive particles that break down into smaller size particles (e.g., to about 10-50 microns, preferably about 15-45 microns, more preferably about 20-40 microns, and most preferably about 25-35 microns) when exposed to mechanical pressure and oxygen during the polishing process. Prior to use, the polishing compositions are advantageously manufactured and stored in an environment that is substantially oxygen free (e.g., under inert nitrogen). The polishing composition may be activated by oxygen. For example, upon opening, no grit may be felt, but the grit becomes evident after about 10 seconds.

The lusterizing compositions include an abrasive material having an initial grit size in a range of about 10 microns to about 60 microns, preferably in a range of about 15 microns to about 50 microns, more preferably in a range of about 20 microns to about 45 microns, and most preferably in a range of about 25 microns to about 40 microns. A light abrasive lusterizing composition has an initial grit size in a range of about 20-60 microns, preferably about 25-55 microns. A finish lusterizing composition has an initial grit size of about 10-50 microns, preferably about 15-40 microns. The abrasive material is dispersed within an appropriate carrier suitable for use in making fine polishing compositions. According to one embodiment, the abrasive material comprises abrasive particles that break down into smaller size particles (e.g., about 1-20 microns, preferably about 2-15 microns, more preferably about 2.5-10 microns, and most preferably about 3-8 microns) when exposed to mechanical pressure and oxygen during the luster restoring process. Prior to use, the lusterizing compositions are advantageously manufactured and stored in an environment that is substantially oxygen free (e.g., under inert nitrogen). The lusterizing composition may be activated by oxygen. For example, upon opening, no grit may be felt, but the grit becomes evident after about 10 seconds.

The abrasives of the polishing and lusterizing compositions are advantageously dispersed within an appropriate liquid or gel carrier. Exemplary carriers may include solvents, such as water and/or organic solvents, thickening agents, emulsifying agents, colorants, and the like. In one embodiment, the solvent(s) are volatile.

According to one embodiment, the abrasive particles in the polishing and/or lusterizing compositions are in the form of agglomerates having an initial particle size once activated upon opening after being stored in a substantially oxygen free environment but progressively break down into smaller particles having a smaller final particle size when exposed to oxygen and mechanical pressure during the polishing and/or lusterizing process. The agglomerates advantageously break down into smaller particles having a final particle size that is less than about 75% of the initial particle size. Preferably, the agglomerates break down into particles having a final particle size that is less than about 50% of the initial particle size, more preferably less than about 33% of the initial particle size, and most preferably less than about 20% of the initial particle size.

The UV protective composition includes a UV protective material dispersed within a carrier having a solvent that, when the composition is worked into a plastic surface by buffing, advantageously causes the UV protective composition to effectively become annealed or melted into the plastic surface. The result is a hardened UV protective coating on the plastic surface that is optically transparent and smooth. The UV protective coating may optionally include a polymerizable material that helps bond the coating to the prepared plastic surface. It is postulated that the polishing and lusterizing compositions may assist in preparing the plastic surface so as to receive and form a stronger bond with the UV protective coating.

The polishing and lusterizing compositions of the invention can be applied in the same manner as conventional polishing compositions, although the results are far superior to conventional compositions. Exemplary apparatus for applying the polishing and lusterizing compositions of the invention include a hand-held buffing or polishing machine, such as rotary, orbital, cordless drills, or oscillating polishing machines, or an open-cell polyurethane buffing pad that may be impregnated with glass fibers. For lighter scratches, it may be advantageous to manually apply the compositions with the open-cell polyurethane buffing pad or with a soft cotton cloth. The compositions of the invention are compatible with existing polishing systems presently used but yield better and longer lasting results.

Almost any type of buffing cloth may work with the compositions of the present invention, including the aforementioned open-cell polyurethane material and cotton pads. Fleece wool, linen, rigid polyurethane, glass wool, and most other natural and synthetic materials work well. The only restraints are that the buffing pad or cloth be sufficiently durable to withstand the mechanical forces of the buffing process, that its stiffness be commensurate with the difficulty of the job in question, and that its component materials not be so hard that they will scratch the plastic surface or heat it up causing it to burn or melt. For example, in one embodiment the buffing pad or cloth employed in application of the polishing composition may be coarser and/or stiffer than the buffing pad or cloth employed in application of the lusterizing composition.

According to one embodiment, the invention includes a kit for restoring light transmission, clarity, and optics to a scratched and/or oxidized plastic surface. The kit includes at least one polishing composition for removing scratches, oxidative damage and damaged UV protective coating from the plastic surface, optionally at least one lusterizing composition for restoring luster and optical clarity to the plastic surface following use of the polishing composition, and at least one UV protective composition for application to the plastic surface following use of the lusterizing composition. The kit may optionally include other components, such as one or more cleaning cloths and/or compositions for use in removing residues from the polishing and lusterizing compositions prior to application of the UV protective composition and one or more polishing or buffing pads or cloths (e.g., two buffing pads composed of reticulated open-cell polyurethane impregnated with glass fibers).

In one embodiment, the invention includes a method for restoring light transmission and clarity to a scratched and/or oxidized plastic surface, such as a plastic window (e.g., an aircraft window) or plastic headlight cover. The method is designed to allow a practitioner to restore essentially any plastic surface, including but not limited to, plastic windows, plastic landing light covers, plastic headlight covers, other automotive plastic light covers, plastic sunglass lenses, plastic corrective eyeglass lenses, and even optical discs such as CDs, DVDs, Blu-Ray discs, etc.

An exemplary method according to the invention includes (1) applying a polishing composition to a buffing pad or cloth for polishing and removing scratches and oxidative damage from a plastic window or other plastic surface using the polishing composition and the buffing pad or cloth, (2) optionally applying a lusterizing composition to the same or a different buffing pad or cloth and restoring luster and optical clarity to the plastic surface using the lusterizing composition and the buffing pad or cloth, (3) cleaning the plastic surface to remove any residues from the polishing and lusterizing compositions, and (4) applying an ultraviolet protective composition to the plastic surface. In one embodiment, the open-cell polyurethane buffing pad is impregnated with glass fibers.

With the present system, aircraft windows have been repeatedly treated as many as twelve times without reaching the minimum thickness requirement. Of course, such testing was done to determine the extent of plastic thickness removal, and such repeated treatment is generally not necessary. In addition, the present system is simple and easy to use, so that it can be done in minutes rather than hours as for other systems.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction and Definitions

The present invention extends to compositions and methods configured to restore clarity and light transmission properties to plastic surfaces, including plastic windows (e.g., aircraft windows), plastic headlight covers, and other plastic surfaces. In particular, the present invention encompasses novel compositions and methods configured to restore the clarity, optics, and light transmission properties of a plastic surface that has been damaged by scratching and/or ultraviolet induced oxidation. It has been found that such imperfections or flaws in the surface of the plastic can be removed by applying to the plastic surface renewal compositions described herein. The compositions may include, for example, compositions for removing scratches and oxidation from a plastic surface, as well as compositions for polishing, lusterizing, and applying an ultraviolet protective coating to the plastic surface. The compositions and methods disclosed herein provide restoration of a damaged plastic surface with the use of abrasives and polishes. The compositions and methods disclosed herein further include compositions for applying a UV protective coating. Restoring a plastic surface according to the present invention provides long-lasting clarity, light transmission, and finish.

As used herein, the term "plastic headlight cover" refers to the molded plastic headlight covers that cover the primary lights on late model automobiles. These plastic headlight covers, which are typically made of polycarbonate, are ubiquitous on today's cars because they are generally lighter and more durable than glass, and plastic can readily be molded into a variety of aerodynamic shapes that fit seamlessly into the front end of the automobile.

One will appreciate, however, that there are many plastic surfaces that can be restored according to the compositions and methods described herein. The methods, and kits disclosed herein are configured to allow a user to efficiently restore any plastic surface that has been damaged by scratching and/or ultraviolet induced oxidation. Another example of such a plastic surface is a plastic aircraft window. Such aircraft windows may be those present on fixed wing aircraft or rotary wing aircraft (i.e., helicopters). Such aircraft windows are often made of polycarbonate, polycarbonate and a LEXAN laminate material, or sandwiched multi-layers of different plastics. One will appreciate, however, that there are many other plastic surfaces that can be restored according to the compositions and methods described herein.

Figure 1:
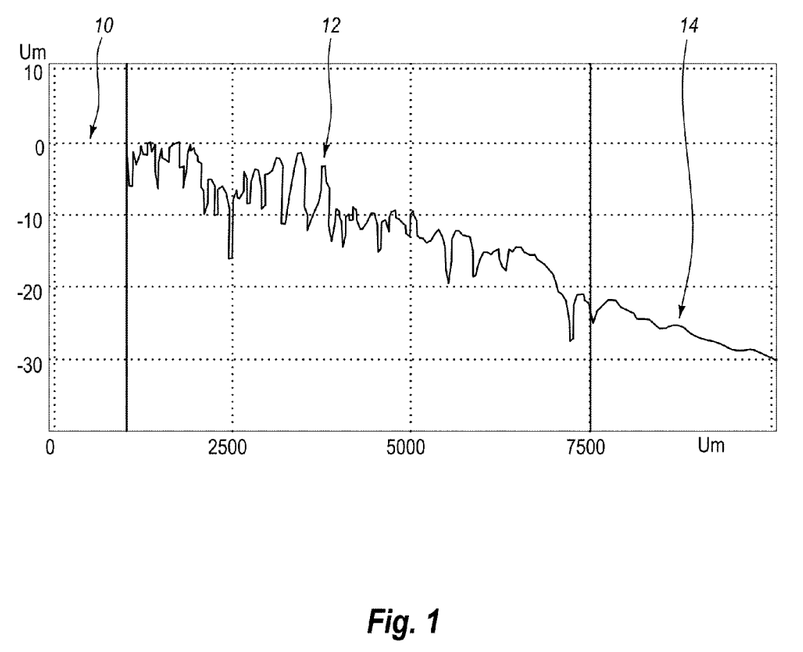
FIG. 1 depicts a profilometric scan of an exemplary plastic headlight cover showing undamaged and scratched regions, and a region restored according to an embodiment of the present invention.

FIG. 1 depicts a profilometric scan of an exemplary plastic surface showing undamaged and scratched regions, and a region restored according to an embodiment of the present invention. Profilometry is a technique that detects irregularities in a surface as a probe scans across the surface. The x-axis of a typical profilometric scan, as shown in FIG. 1, displays the linear distance traveled by the probe across the surface. In this case, the x-axis of FIG. 1 shows that the probe collected data across a linear distance of about 10,000 microns, or about 1 cm. The y-axis of a profilometric scan generally records the magnitude of any irregularities detected as the probe travels linearly across the surface. In this case, the irregularities in the surface are scratches in the plastic.

To prepare the surface of the plastic headlight cover depicted in FIG. 1 some portions were masked off with tape to preserve an undamaged surface while other regions were scratched and then restored. The unmasked region was thoroughly scratched with coarse sandpaper (80 grit) to mimic the scratching and UV damage that occurs over time to a typical plastic headlight cover. Some portions of the scratched surface were then masked off to preserve an example of a damaged surface. The unmasked, damaged region was then restored using the systems and methods disclosed herein.

The scan depicted in FIG. 1 shows these undamaged 10, damaged 12, and restored 14 regions. Undamaged region 10, which ranges on the x-axis from about 0 microns to about 1000 microns, shows a substantially flat surface depicted by the dotted line at Y=0 microns. In contrast, the damaged region 12, which ranges on the x-axis from about 1,000 microns to about 7,500 microns, shows a wavy profile indicative of many deep scratches. In contrast, the restored region 14, which ranges on the x-axis from about 7,500 microns to about 10,000, was restored according the methods of the present invention. Restored region 14 has a substantially more regular profile relative to the damaged region 12. And while the surface of restored region 14 is not perfect, it is greatly improved over the level of scratching observed in scratched region 12.

By comparing the undamaged region 10 to the restored region 14 in FIG. 1, one can appreciate that the restoration process tends to remove a thickness of material from the surface of the plastic of only about 30 microns, or about three one hundredths of a millimeter. This is a very small amount of material, particularly when one considers that the typical headlight cover is several millimeters thick. The plastic surface is restored according to the present invention with the removal of such a small amount of material because the compositions of the invention remove scratches and/or oxidation from the plastic surface without creating additional scratches that have to be removed by progressively finer abrasives. It is also believed that the compositions of the present invention are able to penetrate larger scratches and reform them such that a deep v-shaped cut may be reformed into a shallow u-shaped depression.

The polishing and lusterizing compositions of the present invention can be applied the same way as any polishing compound, although the results are far superior to any of the prior art compounds presently available. The presently preferred method of application for removing scratches from plastic headlight covers and other plastic surfaces is to apply the polishing compounds by means of conventional hand-held buffing or polishing machines, such as rotary, orbital, or oscillating polishing machines, using an open-cell polyurethane buffing pad impregnated with glass fibers. For lighter scratches, it may be preferable to manually apply the compounds with the open-cell polyurethane buffing pad or with a soft cotton cloth. Finally, the compositions of the present invention are compatible with existing polishing systems presently used but yield better results.

It should be understood that almost any type of buffing cloth will work with the compounds of the present invention including the aforementioned open-cell polyurethane material and cotton pads. Fleece wool, linen, rigid polyurethane, glass wool, and most other natural and synthetic materials work well. The only restraints are that the buffing pad or cloth be sufficiently durable to withstand the mechanical forces of the buffing process, that its stiffness be commensurate with the difficulty of the job in question, and that its component materials not be so hard that they will scratch the plastic surface or heat it up causing it to burn or melt.

II. Exemplary Kits for Restoring Plastic Surfaces

In one embodiment, the present invention includes a kit for restoring optical clarity and light transmission properties to a plastic surface damaged by scratching and/or UV-induced oxidation, comprising. The kit includes at least one polishing composition formulated to readily remove scratches and oxidation from the plastic surface, optionally at least one lusterizing composition for finishing the plastic surface, and at least one UV protective composition.

The polishing compositions comprise an abrasive material having an initial grit size in a range of about 50 microns to about 400 microns, preferably in a range of about 60 microns to about 300 microns, more preferably in a range of about 70 microns to about 200 microns, and most preferably in a range of about 75 microns to about 150 microns. The polishing abrasive may be "heavy grit" or "medium grit". Heavy grit polishing abrasives have an initial grit size of about 80-200 microns, preferably about 100-150 microns. Medium grit polishing abrasives have an initial grit size of about 50-100 microns, preferably about 60-90 microns.

The polishing abrasive is advantageously dispersed within an appropriate liquid or gel carrier suitable for use in making polishing compositions. Exemplary carriers may include solvents, such as water and/or organic solvents, thickening agents, emulsifying agents, colorants, and the like.

In one embodiment, the abrasive material comprises abrasive particles that progressively break down into smaller size particles when exposed to oxygen and mechanical pressure during the polishing process. According to one embodiment, the polishing abrasive breaks down to a particle size of about 10-50 microns, preferably about 15-45 microns, more preferably about 20-40 microns, and most preferably about 25-35 microns when exposed to mechanical pressure and oxygen during the polishing process. Prior to use, the polishing compositions are advantageously manufactured and stored in an environment that is substantially oxygen free (e.g., under inert nitrogen). The polish may be activated by oxygen. For example, upon opening, no grit may be felt, but the grit becomes evident after about 10 seconds, and is progressively broken down once evident as a result of further oxygen exposure and/or mechanical pressure.

One will of course appreciate that this phenomenon produces a polishing composition that becomes progressively finer during use. This is advantageous when one considers that typical polishing techniques involve using a series of progressively finer abrasives to remove scratches left by the previous abrasive. The polishing composition of the present invention is advantageously formulated to avoid having to use several polishing compositions to achieve a final polished surface in that the polishing composition encompasses many polishing steps in a single step by virtue of the fact that the abrasive particles become progressively finer as the polishing process continues.

The kit may include at least one lusterizing composition formulated to readily restore optical clarity and light transmission properties to the plastic surface following use of the polishing composition. The lusterizing compositions comprise an abrasive material having an initial grit size in a range of about 10 microns to about 60 microns, preferably in a range of about 15 microns to about 50 microns, more preferably in a range of about 20 microns to about 45 microns, and most preferably in a range of about 25 microns to about 40 microns. The lusterizing abrasive may be "light grit" or "fine grit". Light grit polishing abrasives have an initial grit size of about 20-60 microns, preferably about 25-55 microns. Fine grit polishing abrasives have an initial grit size of about 10-50 microns, preferably about 15-40 microns.

The lusterizing abrasive is advantageously dispersed within an appropriate liquid or gel carrier suitable for use in making polishing and/or finishing compositions. Exemplary carriers may include solvents, such as water and/or organic solvents, thickening agents, emulsifying agents, colorants, and the like.

In one embodiment, the lusterizing composition comprises abrasive particles that progressively break down into smaller size particles when exposed to oxygen and mechanical pressure and oxygen during the lusterizing process. According to one embodiment, the lusterizing abrasive breaks down to a particle size of about 1-20 microns, preferably about 2-15 microns, more preferably about 2.5-10 microns, and most preferably about 3-8 microns when exposed to mechanical pressure and oxygen during the lusterizing process. Prior to use, the lusterizing compositions are advantageously manufactured and stored in an environment that is substantially oxygen free (e.g., under inert nitrogen). The lusterizing composition may be activated by oxygen. For example, upon opening, no grit may be felt, but the grit becomes evident after about 10 seconds, and is progressively broken down once evident as a result of further oxygen exposure and/or mechanical pressure.

One will of course appreciate that this phenomenon produces a lusterizing composition that becomes progressively finer during use. This is highly advantageous when one considers that typical finishing techniques involve using a series of progressively finer abrasives to remove scratches left by the previous abrasive. The lusterizing composition of the present invention is advantageously formulated to avoid having to use several lusterizing compositions to achieve a final lustrous surface in that the lusterizing composition encompasses many lusterizing steps in a single step by virtue of the fact that the abrasive particles become progressively finer as the lusterizing process continues.

According to one embodiment, the abrasive particles in the polishing and/or lusterizing compositions are in the form of agglomerates having an initial particle size soon after opening after storage in a substantially oxygen free environment, but progressively break down into smaller particles having a smaller final particle size when exposed to oxygen and mechanical pressure during the polishing and/or lusterizing process. The agglomerates advantageously break down into smaller particles having a final particle size that is less than about 75% of the initial particle size. Preferably, the agglomerates break down into particles having a final particle size that is less than about 50% of the initial particle size, more preferably less than about 33% of the initial particle size, and most preferably less than about 20% of the initial particle size.

The kit includes at least one composition for applying a UV protective coating to the plastic surface following application of the polishing and lusterizing compositions. The inventor has discovered that the process of restoring a plastic surface (e.g., an aircraft window) with the above described kit does not typically destroy a factory applied UV protective or other proprietary specialty coating disposed over the plastic surface. This is surprising, particularly as the polishing and lusterizing compositions include abrasives. For example, many aircraft windows (e.g., gunner's door windows of a Sikorksy H-60 Hawk or the canopies of an F-18) include proprietary coatings applied for UV protection, anti-reflection, and/or other purposes. Such plastic hardware is often very expensive, and damage or destruction of the specialty coatings would discourage use of the compositions and associated restoration methods were the coatings damaged during the restoration process. For example, a relatively small window such as a gunner's window may cost tens of thousands of dollars. A larger canopy for an aircraft may cost 40 to 60 thousand dollars.

Because the polishing and lusterizing compositions and methods do not damage the specialty coatings of such plastic surfaces, even such expensive, specialty coated plastic surfaces can be restored through use of the inventive compositions and methods without damage to such coatings. Of course, the compositions and methods may also be employed on non-coated plastic surfaces. Without a protective coating, the surface would quickly be degraded by scratching and UV induced oxidation, therefore it is advantageous to apply a UV protective coating after polishing and lusterizing, particularly to previously non-coated plastic surfaces. The UV protective composition includes a UV protective material dispersed within a carrier having a solvent that advantageously causes the UV protective composition to effectively become annealed or melted into the plastic surface during the buffing process. The result is a hardened UV protective coating on the plastic surface that is optically transparent and smooth. The UV protective coating may optionally include a polymerizable material that helps bond the coating to the prepared plastic surface. It is postulated that the polishing and lusterizing compositions may assist in preparing the plastic surface so as to receive and form a stronger bond with the UV protective coating by activating the surface and creating bonding sites where the protective composition can form physical and chemical bonds to the plastic surface.

In the past, transparent protective coatings of high optical quality for UV protection have been obtained on plastic substrates by spin and dip coating, followed by baking. The UV protective compositions of the invention allow for low temperature application (T<130° F.), which is achieved by the chemical dispersion of the UV protective coating within a solvent carrier, which causes the coating to anneal itself to a plastic aircraft window or other plastic surface similar to the way it is done in the original manufacturing process. It is believed that solids in the coating are made of crystalline and UV protective nano particles that coalesce into larger particles by means of a polyermizable material. This causes deposition of the UV protective particles as a thick single layer (>400 nm). The transparency in the visible range is high, T≈87%, the abrasion resistance is in agreement with DIN 58-196-G10, and the hardness according to ASTM D 3363-92a is 1H. The application process allows for antiglare coatings with an adjustable gloss of 60 to 80 GU and an optical resolution >8 lines/mm.

In preparation for application of the UV protective composition, the plastic surface may be heated, e.g., with a heat gun. In one embodiment, the plastic surface is heated to a temperature less than about 130° F. For example, in one embodiment, it may be heated to at least about 110° F. (e.g., between about 110° F. and about 130° F.). In another embodiment, the plastic surface may be heated to a slightly higher temperature, for example, at least about 140° F. (e.g., between about 140° F. and about 160° F.). Heat may typically be applied for between about 2 and about 5 minutes (e.g., about 3 minutes). In addition, because the UV protective composition may have only a relatively short life-span once exposed to oxygen, the container containing this composition is preferably not opened until the plastic substrate has been heated as described above. Once the plastic substrate is heated, the protective coating composition container is opened and immediately applied. Heating the plastic surface above ambient temperature may result in better bonding of the hard protective coating over the plastic substrate.

The kit may include at least one buffing pad or buffing cloth for applying the polishing and lusterizing compositions to the plastic surface. The buffing pad or buffing cloth can either be used manually or they can be attached to a drill or a mechanical polisher. In one embodiment, the buffing pad or buffing cloth are impregnated with glass fibers to enhance the action of the polishing and lusterizing compounds. It is believed that the glass fibers enhance the action of the polishing and lusterizing compounds by penetrating or "reaching" into deep scratches such that deep scratches are reformed from deep v-shaped grooves to shallow u-shaped depressions. By reforming the surface, the glass fibers allows some scratches to be restored without having to remove a layer of plastic from the plastic surface without having to remove a layer of plastic equal to the depth of the deepest scratch.

In embodiments where both a polishing composition and a lusterizing composition are provided and applied, the buffing pads or cloths employed, as well as the conditions under with application occurs, may differ. For example, the first buffing pad or cloth employed to apply the polishing composition may comprise a coarse "yellow" foam pad, a.k.a a "cutting pad" comprising a foam pad (e.g., an open-cell polyurethane foam) having a substantially uniform cell structure. Such uniform cell structure may be achieved by forming the buffing pad from the central portion of the open-cell polyurethane foam material. The first buffing pad may be stiffer or more rigid than the second buffing pad or cloth used to apply the lusterizing composition. The second buffing pad may be softer than the first buffing pad (e.g., a soft "gray pad").

III. Exemplary Methods for Restoring Plastic Surfaces

In one embodiment, the present invention includes a method for restoring light transmission, optics, and clarity to a scratched and/or oxidized plastic surface. The method is configured to allow a practitioner to restore essentially any plastic surface. Examples of plastics surfaces that can be restored according to the present invention include plastic windows (e.g., aircraft windows), plastic headlight covers, other plastic automotive light covers, sighting mechanisms and plastic eyeglass lenses, including sunglass lenses and plastic corrective lenses.

An exemplary method according to the invention includes (1) applying a polishing composition to a buffing pad or cloth for polishing and removing scratches and oxidative damage from a plastic surface using the polishing composition and the buffing pad or cloth, (2) optionally applying a lusterizing composition to the same or different buffing pad or cloth and restoring luster and optical clarity to the plastic surface using the lusterizing composition and the buffing pad or cloth, (3) cleaning the plastic surface to remove any residues from the polishing and lusterizing compositions, and (4) applying an ultraviolet protective composition to the plastic surface. In one embodiment, the open-cell polyurethane buffing pad is impregnated with glass fibers.

Figure 2:
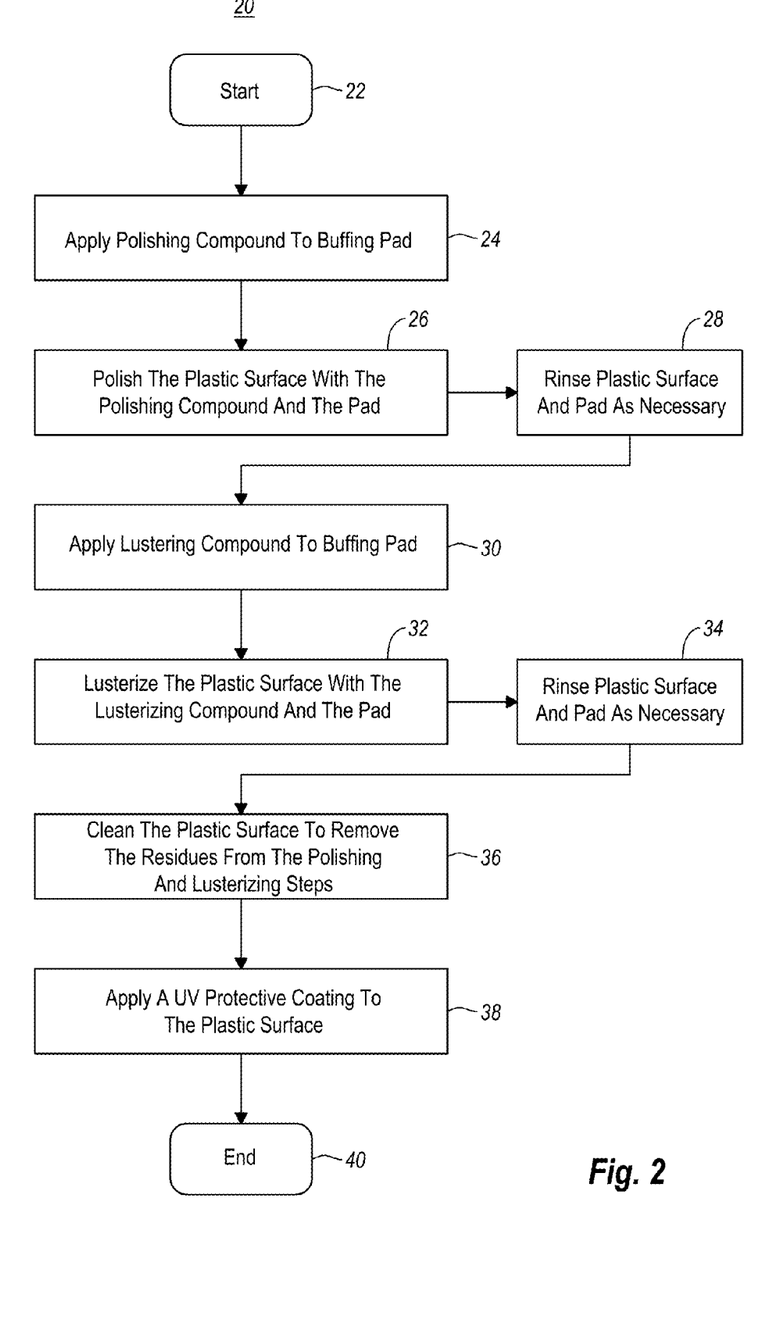
FIG. 2 is a flow-chart of a method according an embodiment of the present invention.

FIG. 2 depicts a flow-chart 20 of one embodiment of a method for restoring essentially any type of plastic surface that has been damaged by scratching and/or UV-induced oxidation. Flow-chart 20 starts at 22 and ends at 40. In one embodiment, the method includes applying a polishing composition to an open-cell polyurethane buffing pad at 24. The polishing composition and the buffing pad are used for polishing and removing scratches and oxidative damage from a plastic surface at 26. In one embodiment, the open-cell polyurethane buffing pad may be impregnated with glass fibers. It is believed that the polishing composition and the glass fibers are able to penetrate or reach into larger scratches in the plastic surface and reform the scratches from a deep v-shaped gouge to a u-shaped depression. It is this property of the polishing system that allows larger scratches to be removed without having to remove a layer of plastic equal to the depth of the deepest scratch.

The buffing pad and the polishing composition may be used for polishing and removing scratches and oxidative damage from a plastic surface by attaching the buffing pad to a conventional hand-held polishing or buffing machine. Alternatively, the buffing pad can be used manually with the first abrasive composition for polishing and removing scratches and oxidative damage from a plastic surface. The plastic surface can be rinsed as necessary at 28 in order to wash away dirt and/or plastic residue, and to provide lubrication between the plastic surface and the buffing pad and polishing composition.

One will of course appreciate that this phenomenon produces a polishing composition that becomes progressively finer during use. This is highly advantageous when one considers that typical polishing techniques involve using a series of progressively finer abrasives to remove scratches left by the previous abrasive. The polishing composition of the present invention is advantageously formulated to avoid having to use several polishing compositions to achieve a final polished surface in that the polishing composition encompasses many polishing steps in a single step by virtue of the fact that the abrasive particles become progressively finer as the polishing process continues.

In one embodiment, the method includes applying a lusterizing composition to the open-cell polyurethane buffing pad at 30. The lusterizing composition and the buffing pad are used for restoring the luminous output and optics of the plastic surface at 32. The buffing pad and the lusterizing composition may be used for restoring optics to the plastic surface by attaching the buffing pad to a conventional cordless drill or air and electric hand-held polishing or buffing machine. Alternatively, the buffing pad can be used manually with the lusterizing composition for restoring optics to the plastic surface. The plastic surface can be rinsed as necessary at 34 in order to wash away dirt and/or plastic residue, and to provide lubrication between the plastic surface and the buffing pad and lusterizing composition.

One will of course appreciate that this phenomenon produces a lusterizing composition that becomes progressively finer during use. This is highly advantageous when one considers that typical lusterizing techniques involve using a series of progressively finer abrasives to remove scratches left by the previous abrasive. The lusterizing composition of the present invention is advantageously formulated to avoid having to use several lusterizing compositions to achieve a final smooth surface with high optical clarity in that the lusterizing composition encompasses many lusterizing steps in a single step by virtue of the fact that the abrasive particles become progressively finer as the lusterizing process continues.

In one embodiment, the method includes cleaning the plastic surface to remove residues from the polishing and luster restoring steps at 36. Cleaning can be achieved with a spray of water or with a damp cloth. Generally, the cleaning step should be conducted with care to avoid rescratching the plastic surface. Moreover, the cleaning step should be conducted with utmost care to remove all of the residues from the polishing and luster restoring steps prior to the application of a UV-protective coating.

In one embodiment, the method includes a step of applying a UV-protective composition to the plastic surface at 38. Where the plastic surface does not include a factory applied UV coating or the coating has been damaged or worn away in spots, if a new UV-protective coating is not applied, exposure to the elements would quickly degrade the plastic surface and the benefits of the restoration would be lost.

In one embodiment, the ultraviolet protective composition comprises at least one solvent that allows the coating to anneal to the plastic surface, at least one polymer or polymerizable compound that forms a hard, clear coating on the plastic surface, and at least one ultra-violet protective compound that protects the plastic surface from future UV induced damage.

In one embodiment, the solvent in the UV protective composition includes at least one ether compound. In an alternative embodiment, the solvent is an alcohol. Preferably the solvent is volatile. When ether is the main solvent, the ether compound preferably constitutes about 1% to about 20% of the UV protective composition, calculated on a weight/weight basis. More preferably, the ether compound constitutes about 5% to about 15% and most preferably, about 8-12%. When alcohol is the main solvent, the alcohol preferably constitutes about 70% to about 98% of the UV protective composition, calculated on a weight/weight basis. More preferably, the alcohol constitutes about 80% to about 95% of the UV protective composition. Most preferably, the alcohol constitutes about 87% to about 93%. Exemplary ether compounds include dipropylene glycol n-butyl ether and ethylene glycol monobutyl ether. Exemplary alcohols include isopropyl alcohol. The solvent may also comprise a blend of alcohol and ether compounds (e.g., isopropyl alcohol and ethylene glycol monobutyl ether) without departing from the spirit of the invention.

In one embodiment, the polymer or polymerizable compound that forms a hard, clear coating on the plastic surface includes at least one acrylic-urethane hybrid polymer dispersion. Exemplary acrylic-urethane hybrid polymer dispersions include Hybridur 570™ and Hybridur 580™, which are available from Air Products and Chemical, Inc. Hybridur 570™ and Hybridur 580™ may be used alone or in combination. Preferably, Hybridur 570™ constitutes about 40% to about 65% of the ultraviolet protective composition, calculated on a weight/weight basis. More preferably, Hybridur 570™ constitutes about 45% to about 60% of the ultraviolet protective composition, calculated on a weight/weight basis. Most preferably, Hybridur 570™ constitutes about 50% to about 55% of the ultraviolet protective composition, calculated on a weight/weight basis. Preferably, Hybridur 580™ constitutes about 10% to about 35% of the ultraviolet protective composition, calculated on a weight/weight basis. More preferably, Hybridur 580™ constitutes about 15% to about 30% of the ultraviolet protective composition, calculated on a weight/weight basis. Most preferably, Hybridur 580™ constitutes about 20% to about 25% of the ultraviolet protective composition, calculated on a weight/weight basis.

In another embodiment, the polymer or polymerizable compound that forms a hard, clear coating on the plastic surface includes at least one acrylic polymer or polymerizable material. An exemplary acrylic polymer or polymerizable material is Elvacite 2776™, which is available from Lucite International. Preferably, Elvacite 2776™ constitutes about 0.5% to about 10% of the ultraviolet protective composition, calculated on a weight/weight basis. More preferably, Elvacite 2776™ constitutes about 1% to about 8% of the ultraviolet protective composition, calculated on a weight/weight basis. Most preferably, Elvacite 2776™ constitutes about 2% to about 5% of the ultraviolet protective composition, calculated on a weight/weight basis.

The ultraviolet protective coating includes at least one ultraviolet protective compound to protect the plastic surface from UV-induced damage. Exemplary ultraviolet protective compounds are hindered amine compounds, such as Tinuvin 384™ and Tinuvin 292™, which are available from Ciba, benzophenones, benzotriazoles, hydroxyphenyltriazines, and hydroxyphenylbenzotriazoles. Preferably, the ultraviolet protective compound or compounds constitute about 0.01% to about 1% of the ultraviolet protective coating, calculated on a weight/weight basis. More preferably, the ultraviolet protective compound or compounds constitute about 0.05% to about 0.5% of the ultraviolet protective coating, calculated on a weight/weight basis. Most preferably, the ultraviolet protective compound or compounds constitute about 0.1% to about 0.3% of the ultraviolet protective coating, calculated on a weight/weight basis.

Additional ingredients which may be included in the ultraviolet protective composition include wetting agents to improve the uniformity of the coating, plasticizers to increase the durability of the coating, and antifoaming agents to discourage the formation of air bubbles in the ultraviolet protective coating as it is applied to the plastic surface. Exemplary wetting agents include polyether modified siloxanes, such as BYK-345™, BYK-346™, BYK-347™, BYK-348™, BYK-349™, which are available from BYK Chemie, Inc, and sodium dioctyl sulfosuccinate, which is available from Cytec. Exemplary plasticizers include derivatives of citric acid, such as triethyl citrate, acetyl triethyl citrate, tributyl citrate, acetyl tributyl citrate, and tri-(2-ethylhexyl)-citrate. Exemplary defoamers include the Surfynol™ line of chemicals available from Air Products and Chemicals, Inc.

EXAMPLES OF SPECIFIC FORMULAS

Below are specific examples of compositions and methods which have been created according to the present invention.

Example 1

A medium abrasive polishing composition in accordance with the present invention was prepared with the following formulation:

|  | % W/W |
| --- | --- |
| Solid abrasive material | 30.0 |
| Propylene Glycol | 5.0 |
| Carboxymethyl Cellulose | 1.0 |
| Ethylene Oxide/Propylene Oxide Block Copolymer | 2.5 |
| Fragrance 98164 | 0.2 |
| 1-(3-chloroallyl)-3,5,7-Triaza-1-azonia adamantane chloride | 0.2 |

Sufficient deionized water was added to bring the total volume to 100 percent (w/w).

The composition is prepared, packaged, and stored in a substantially oxygen free environment. For example, the dry material is added to a mixing apparatus. Subsequently, the dry materials and the mixer are exposed to a vacuum such that essentially all oxygen is evacuated from the dry ingredients. An inert gas such as nitrogen is added back to the mixing apparatus, the liquid ingredients are added, and the composition is mixed. The composition is subsequently packaged in a substantially oxygen free environment.

It is believed that in some embodiments, preparing and packaging the composition under oxygen free conditions allows the abrasive particles to agglomerate into larger particles. It is postulated that this aggregation occurs in a substantially oxygen free environment because the lack of oxygen alters the surface charge properties of the abrasive particles. A person having ordinary skill in the art will appreciate that this aggregation is progressively reversed when the abrasive particles are exposed to oxygen and mechanical pressure during the polishing process. In other embodiments, the abrasives may agglomerate only after opening, and then progressively break down to finer grit sizes under further exposure to oxygen and/or mechanical pressure. For example, with such compositions, upon opening, no grit may be felt, but the grit becomes evident after about 10 seconds.

This formulation exhibited a creamy viscous lotion consistency, and was cream in color. In this and other examples coconut fragrance was added for aesthetic purposes only, and it should be understood that fragrance could be omitted or substituted without altering the efficiency of the polishing composition. This formulation has a wide variety of uses for removing scratches from plastic surfaces. It is a presently preferred composition for initial treatment for polishing and removal of scratches and oxidative damage from plastic headlight covers.

A heavy to medium abrasive formula in accordance with this example would also be useful for initial treatment in restoring and repairing plastic material such as plastic windows, plastic or acrylic furniture, plastic shields on face masks, light bars on police vehicles, ski trams or gondolas, the faces of advertising signs, and many other applications.

It should be understood that various alterations may be made without departing from the broader teachings of the present invention. In this example, the solid polishing material may include a blend of kaolinitic quartz, silicon dioxide, and calcined alumina. The particle size of the polishing materials ranged from about 50 microns to about 400 microns. Although it is preferred that the total abrasives content be about 23%, a broader range of abrasive content is about 15% to about 35% with a more preferred range being about 20% to about 30%. In formulating a heavy to medium abrasive formulation of the type set forth in this example, it is to be understood that variations in the ratio of amounts of the remaining constituents may be made as required to maintain their function.

Example 2

A light abrasive lusterizing composition in accordance with the present invention was prepared with the following formulation:

|  | % W/W |
| --- | --- |
| Solid abrasive material | 30.0 |
| Propylene Glycol | 5.0 |
| Carboxymethyl Cellulose | 1.0 |
| Ethylene Oxide/Propylene Oxide Block Copolymer | 2.5 |
| Fragrance 98164 | 0.2 |
| 1-(3-chloroallyl)-3,5,7-Triaza-1-azonia adamantane chloride | 0.2 |

Sufficient deionized water was added to bring the total volume to 100 percent (w/w), which yielded a viscous, creamy fluid with a lotion-like consistency. In this and other examples coconut fragrance was added for aesthetic purposes only, and it should be understood that fragrance could be omitted or substituted without altering the efficiency of the polishing composition.

The composition is prepared, packaged, and stored in a substantially oxygen free environment. For example, the dry material is added to a mixing apparatus. Subsequently, the dry materials and the mixer are exposed to a vacuum such that essentially all oxygen is evacuated from the dry ingredients. An inert gas such as nitrogen is added back to the mixing apparatus, the liquid ingredients are added, and the composition is mixed. The composition is subsequently packaged in a substantially oxygen free environment.

It is believed that preparing and packaging the composition under oxygen free conditions may allow the abrasive particles to aggregate into larger particles. It is postulated that this aggregation may occur in a substantially oxygen free environment because the lack of oxygen alters the surface charge properties of the abrasive particles. A person having ordinary skill in the art will appreciate that this aggregation may progressively be reversed when the abrasive particles are exposed to oxygen and mechanical pressure during the polishing process.

This light abrasive formulation has a variety of uses, but is particularly preferred as a lusterizing treatment for plastics first treated with the polishing composition of Example 1. It is preferred for use on plastic headlight covers, plastic windows, plastic or acrylic furniture, plastic shields on face masks, light bars on police vehicles, ski trams or gondolas, the faces of advertising signs, and many other applications. It would also be useful for buffing or removing minor scratches, hazing and discoloration from other plastics, particularly for removing scratches from eyeglass lenses (e.g., sunglass lenses and/or corrective lenses.

It should be understood that various alterations may be made without departing from the broader teachings of the present invention. In this example, the solid polishing material included a blend of kaolinitic quartz, silicon dioxide, and calcined alumina. The particle size of the polishing materials ranged from about 1 micron to about 50 microns. Although it is preferred that the total abrasives content be about 23%, a broader range of abrasive content is about 15% to about 35% with a more preferred range being about 20% to about 30%. In formulating a light abrasive formulation of the type set forth in this example, it is to be understood that variations in the ratio of amounts of the remaining constituents may be made as required to maintain their function.

Example 3

A heavy abrasive polishing composition in accordance with the present invention was prepared with the following formulation:

| Ingredient | Trade Name/Supplier | % W/W |
| --- | --- | --- |
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 18.0 |
| Fused Silica (8.8 microns average) | Siltex 44/Kaopolite Co. | 3.0 |
| Boehmite Alumina (60 microns average) | Catapal D/Sasol (formerly Vista) | 2.0 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| Deionized water | | q.s. to 100 |

This heavy formulation is useful for quick removal of scratches from most of the plastic materials listed in Example 1, although it would not likely be used with compact discs or the like. A medium formulation such as set forth in Example 1 and/or a light formulation as set forth in Example 2 might be used to complete the repair after an initial treatment with this heavy formulation.

Example 4

A medium abrasive polishing composition in accordance with the present invention was prepared with the following formulation:

| Ingredient | Trade Name/Supplier | % W/W |
| --- | --- | --- |
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 8.0 |
| Celite Diatomaceous Silica | Super Floss or Snow Floss/Celite | 7.0 |
| Boehmite Alumina | Catapal D/Sasol (formerly Vista) | 8.0 |

-continued

| Ingredient | Trade Name/Supplier | % W/W |
|---|---|---|
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| Deionized water | | q.s. to 100 |

This formulation is suitable for many uses, such as those described in Example 1. The boehmite aluminum has the advantage of being relatively soft. It will break into smaller fragments during use, assisting in repair of the increasingly small scratches which exist during the course of repair.

Example 5

A fine abrasive lustering composition in accordance with the present invention was prepared with the following formulation:

| Ingredient | Trade Name/Supplier | % W/W |
|---|---|---|
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 23.0 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| Deionized water | | q.s. to 100 |

This fine abrasive formulation is similar to Example 2 but has a finer abrasive. As with Example 2, this lusterizing composition has a variety of uses, but is particularly preferred as a final treatment for plastic surfaces first treated with the composition of Example 1 and/or Example 3.

Example 6

A light abrasive polishing composition has the following formulation:

| Ingredient | Trade Name/Supplier | % W/W |
|---|---|---|
| Magnesium Aluminum Silicate (5% dispersion) | Van Gel/RT Vanderbilt | 30.0 |
| Propylene Glycol | Propylene Glycol | 5.0 |
| Carboxymethyl Cellulose | CMC 7H or CMC 9M31XF/Aqualon-Hercules | 1.0 |
| Aluminum Silicate | Kaopolite/Kaopolite Co. | 11.5 |
| Zirconia (2-4 microns average) | | 11.5 |
| Ethylene Oxide/Propylene Oxide Block Copolymer | Tergitol 15-S-7/Dow | 2.5 |
| Fragrance 98764 | Fragrance 98764/Noville | 0.2 |
| 1-(3-chloroallyl)-3,5,7-Triaza-1-azonia-adamantane chloride | Dowicil 75 | 0.2 |
| Deionized water | | q.s. to 100 |

This example includes zirconia (zirconium oxide) as an abrasive. This is a hard material that should be used with care.

Example 6B

A fine abrasive lustering composition in accordance with the present invention was prepared with the following formulation:

| | % W/W |
|---|---|
| Aluminum Silicate | 15-30 |
| Propylene Glycol | 3-12 |
| Fused Silica | 1-5 |
| Secondary Alcohol Ethoxylate | 1-5 |
| Boehmite Alumina | |
| Xanthan Gum | 0.1-1 |
| Sodium Carboxymethyl Cellulose | 0.2-1.2 |
| Phenoxyethanol | 0.5-1.5 |
| Diazolidinyl Urea | 0.1-1 |
| Methylparaben | 0.1-0.5 |
| Propylparaben | 0.1-0.5 |
| Deionized water | q.s. to 100 |

The boehmite aluminum has the advantage of being relatively soft. It will break into smaller fragments during use, assisting in repair of the increasingly small scratches which exist during the course of repair. Similar to Example 6, this lusterizing composition has a variety of uses, but is particularly preferred as a final treatment for plastic surfaces first treated with a polishing composition such as those of Example 1, Example 3 above, or Example 7 of U.S. patent application Ser. No. 13/069,225 filed Mar. 22, 2011 and entitled UV PROTECTIVE COATING COMPOSITION AND METHOD, incorporated herein by reference.

Example 7

An ultraviolet protective coating was prepared in accordance with the present invention with the following formulation:

| Ingredient description | Trade name | % W/W |
|---|---|---|
| Dipropylene Glycol n-Butyl Ether | Arcosolve DPnB | 9.8 |
| Polyether modified polydimethylsiloxane | BYK-346 | 0.5 |
| Light stabilizer | Tinuvin 384 | 0.7 |
| Light stabilizer | Tinuvin 292 | 0.4 |
| Urethane Hybrid Polymer | Hybridur 570 Polymer Dispersion | 51.5 |
| Urethane Hybrid Polymer | Hybridur 580 Polymer Dispersion | 22.1 |
| Defoamer | Surfynol DF-58 | 0.2 |
| Water, DI | Water, DI | 14.9 |
| | TOTAL | 100.0 |

The coating composition appeared as a uniform flowable liquid. This light ultraviolet protective coating has a variety of uses, but is particularly preferred as a coating for restoring a UV protective layer to plastic surfaces treated with one or more of the compositions of Examples 1-6B. It is preferred for use on plastic headlight covers, plastic windows, plastic or acrylic furniture, plastic shields on face masks, light bars on police vehicles, ski trams or gondolas, the faces of advertising signs, and many other applications. It would also be useful for applying a UV protective coating to other plastics, particularly eyeglass lenses (e.g., sunglass lenses and/or corrective lenses.

It should be understood that various alterations may be made without departing from the broader teachings of the present invention. In formulating an ultraviolet protective coating formulation of the type set forth in this example, it is to be understood that variations in the ratio of amounts of the remaining constituents as required to maintain their function.

Example 8

An ultraviolet protective coating was prepared in accordance with the present invention with the following formulation:

| Ingredient | Trade Name/Supplier | % w/w |
| --- | --- | --- |
| Isopropyl alcohol | Any suitable vendor | 88.85 |
| Acrylic polymer | Elvacite 2776/Lucite International | 3.0 |
| Sodium dioctyl sulfosuccinate, 75% | Aerosol OT-75/Cytec | 0.05 |
| Triethyl citrate | Citroflex 2/Morflex | 0.3 |
| Ethylene Glycol monobutyl ether | Dowanol EB/Dow | 7.0 |
| Light stabilizer | Tinuvin 384/Ciba | 0.5 |
| Light stabilizer | Tinuvin 292/Ciba | 0.3 |
| | TOTAL | 100.0 |

Figure 3A:
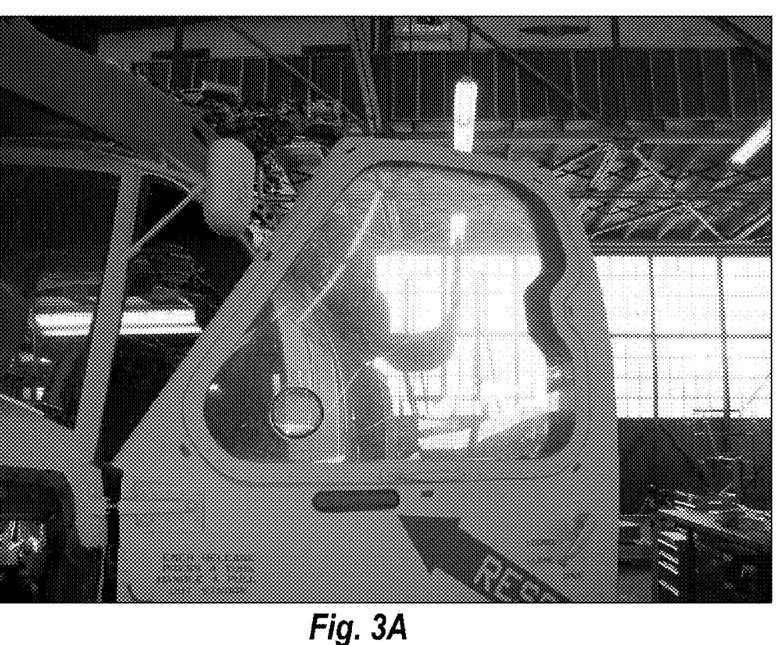
FIG. 3A is a photograph showing an aircraft window before restoration.
Figure 3B:
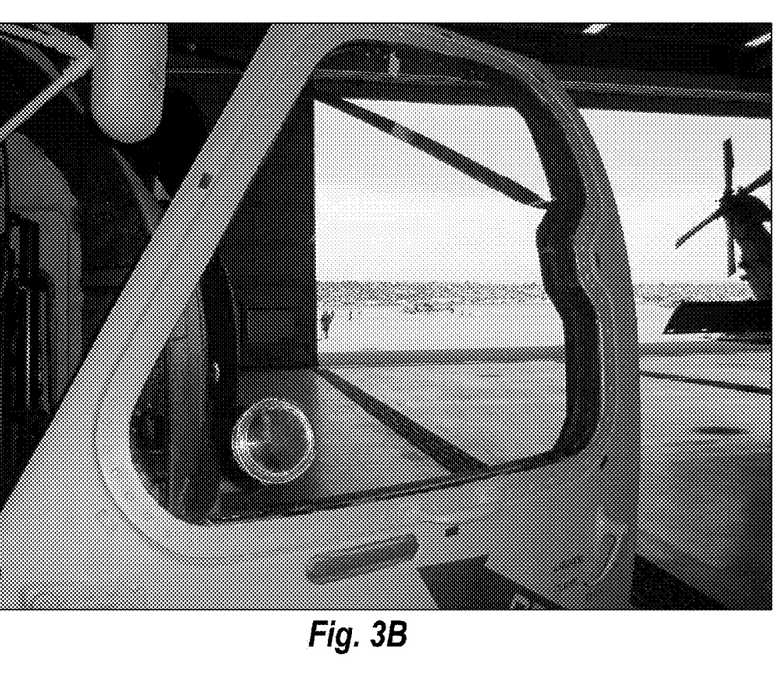
FIG. 3B is a photograph showing the aircraft window of FIG. 3A after restoration.
Figure 4A:
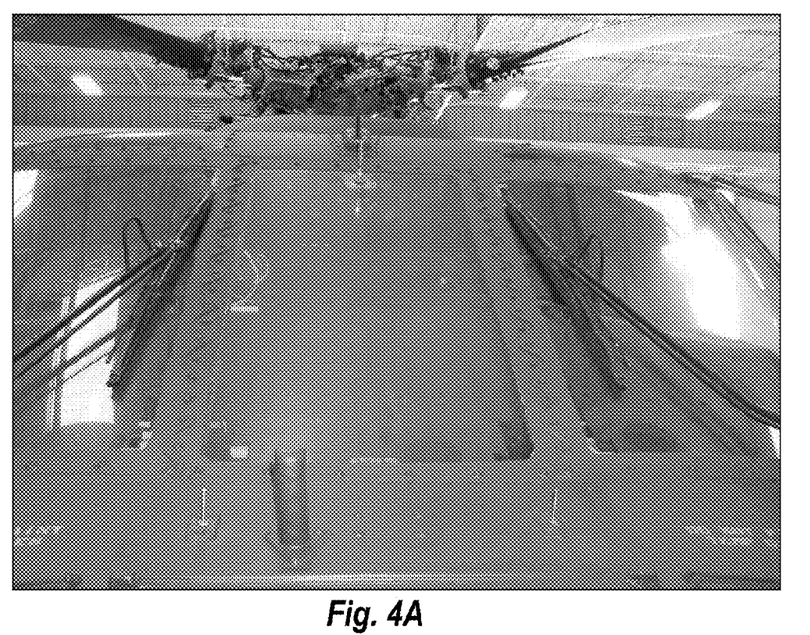
FIG. 4A is a photograph of another series of aircraft windows before restoration.
Figure 4B:
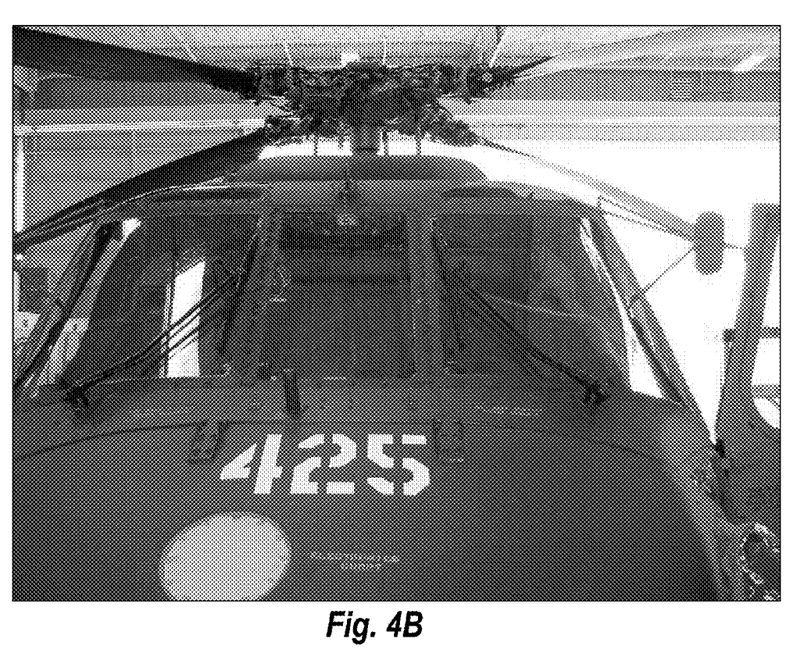
FIG. 4B is a photograph showing the aircraft windows of FIG. 4A after restoration.
Figure 5:
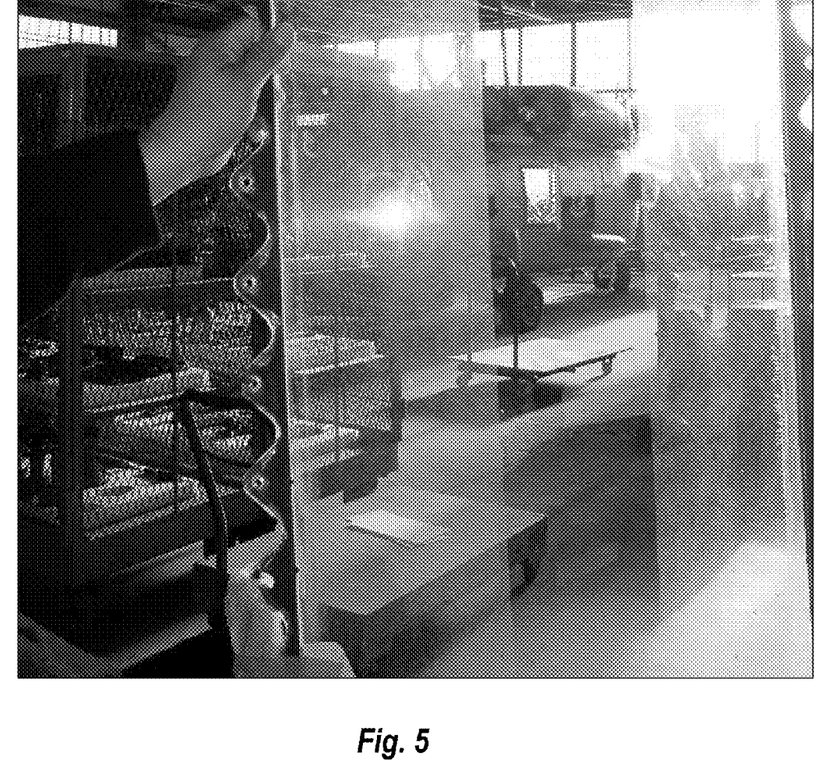
FIG. 5 is a photograph showing another aircraft window including a central portion that has been restored, while the portions on either side have not been restored.

The coating composition appeared as a uniform flowable liquid and dried to a hard, clear surface in approximately 30 minutes. This formulation was used in restoration of the aircraft windows seen in FIGS. 3A-5, in conjunction with an abrasive compositions including an abrasive material dispersed within a liquid or gel carrier, as described above. Additional details of the particular abrasive compositions employed are disclosed in U.S. patent application Ser. No. 13/069,225 filed Mar. 22, 2011 and entitled UV PROTECTIVE COATING COMPOSITION AND METHOD, the disclosure of which is herein incorporated by reference in its entirety. FIGS. 3A and 3B show before and after photographs, respectively, of the side windows of a Sikorsky H60 Hawk that were treated according to the inventive method. FIGS. 4A and 4B show before and after photographs, respectively of the front windows of the same helicopter, while FIG. 5 shows the gunner's window with a central portion after restoration, and both side portions before treatment.

Example 9

An ultraviolet protective coating was prepared in accordance with the present invention with the following formulation:

| Ingredient | Trade Name/Supplier | % w/w |
| --- | --- | --- |
| Isopropyl alcohol | Any suitable vendor | 90.95 |
| Acrylic polymer | Elvacite 2776/Lucite International | 3.0 |

-continued

| Ingredient | Trade Name/Supplier | % w/w |
| --- | --- | --- |
| Sodium dioctyl sulfosuccinate, 75% | Aerosol OT-75/Cytec | 0.05 |
| Dipropylene Glycol n-Butyl Ether | Arcosolve DPnB/Arco | 5.0 |
| Light stabilizer | Tinuvin 384/Ciba | 0.5 |
| Light stabilizer | Tinuvin 292/Ciba | 0.3 |
| Antifoam | Surfynol DF-58/ Air Products | 0.2 |
| | TOTAL | 100.0 |

The coating composition appeared as a uniform flowable liquid and dried to a hard, clear surface in approximately 30 minutes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for restoring optical clarity and light transmission properties to a plastic surface damaged by scratching and/or UV-induced oxidation, comprising:
providing at least one abrasive composition including abrasive particles dispersed in a liquid or gel carrier, the abrasive composition being initially manufactured and stored in a substantially oxygen free environment, wherein the abrasive composition comprises abrasive particles selected from the group consisting of polishing abrasives with a grit size in a range of about 50 microns to about 400 microns and lusterizing abrasives with a grit size in a range of about 10 microns to about 60 microns;
treating a damaged plastic surface by applying the at least one abrasive composition to the plastic surface to remove scratches and/or UV-induced oxidation from the plastic surface; and
protecting the treated plastic surface from UV damage by applying to the treated plastic surface a UV protective composition that includes a UV-protective material, a solvent, and a polymer or polymerizable material.

2. A method as recited in claim 1, wherein the UV protective composition is annealed or melted into the plastic surface.

3. A method as recited in claim 1, wherein the polymer or polymerizable material comprises an acrylic polymer or acrylic-urethane.

4. A method as recited in claim 1, wherein the solvent of the UV protective composition is selected from the group consisting of alcohols, ethers, isopropyl alcohol, ethylene glycol monobutyl ether, and mixtures thereof.

5. A method as recited in claim 1, wherein the at least one abrasive composition comprises both a polishing composition and a lusterizing composition, the step of treating the damaged plastic window surface comprising:
applying the polishing composition including a polishing abrasive dispersed within a first liquid or gel carrier; and
applying the lusterizing composition including a lusterizing abrasive dispersed within a second liquid or gel carrier.

6. A method as recited in claim 5, the polishing abrasive having a grit size in a range of about 60 microns to about 300 microns and the lusterizing abrasive having a grit size in a range of about 15 microns to about 50 microns.

7. A method as recited in claim 1, wherein the at least one abrasive composition is applied to the plastic surface using at least one buffing pad or buffing cloth impregnated with glass fibers.

8. A method as recited in claim 5, wherein a buffing pad or buffing cloth is used in application of the polishing composition and a different buffing pad or buffing cloth having different characteristics is used in application of the lusterizing composition.

9. A method as recited in claim 8, wherein a buffing pad comprising an open-cell polyurethane foam is used in application of the polishing composition, and a different buffing pad or buffing cloth that is softer than that used in application of the polishing composition is used in application of the lusterizing composition.

10. A method as recited in claim 1, wherein the plastic surface is an aircraft window.

11. A method as recited in claim 10, wherein the aircraft window comprises polycarbonate or a multi-layer laminate material.

12. A method as recited in claim 10, wherein the aircraft window comprises a coating and the method does not damage the coating.

13. A method as recited in claim 10, wherein the aircraft window is non-coated.

14. A method as recited in claim 1, wherein the UV protective material is selected from the group consisting of hindered amine compounds, benzophenones, benzotriazoles, hydroxyphenyltriazines, and hydroxyphenylbenzotriazoles.

15. A method as recited in claim 1, further comprising removing residue from the treated plastic surface using at least one of a cloth, water, or a composition before applying the UV protective composition.

16. A method as recited in claim 1, wherein the plastic surface comprises an automotive plastic light cover, a plastic sunglass lens, or a plastic corrective eyeglass lens.

17. A method for restoring optical clarity and light transmission properties to a plastic surface damaged by scratching and/or UV-induced oxidation, comprising:
polishing the plastic surface to remove scratches and/or oxidative damage by applying to the plastic surface a polishing composition initially manufactured and stored in a substantially oxygen free environment and having a polishing abrasive with a grit size in a range of about 50 microns to about 400 microns dispersed within a liquid or gel carrier;
lusterizing the polished plastic surface to further improve optical clarity by applying to the plastic surface a lusterizing composition initially manufactured and stored in a substantially oxygen free environment and having a lusterizing abrasive with a grit size in a range of about 10 microns to about 60 microns dispersed within a liquid or gel carrier; and
protecting the polished and lusterized plastic surface from UV damage by applying to the plastic surface at least one UV protective composition for applying a UV protective coating to the plastic surface treated using the polishing and lusterizing compositions.

18. A method as recited in claim 17, wherein the UV protective composition comprises a UV protective material, a polymer or polymerizable material, and at least one solvent that causes the UV protective coating to anneal into the plastic surface when the UV protective composition is buffed onto the plastic surface.

19. A method as recited in claim 18, wherein the polymer or polymerizable material comprises an acrylic polymer or acrylic-urethane, and wherein the solvent of the UV protective composition is selected from the group consisting of ethers, alcohols, isopropyl alcohol, ethylene glycol monobutyl ether, and mixtures thereof.

20. A method as recited in claim 17, wherein a buffing pad or buffing cloth is used in application of the polishing composition and a different buffing pad or buffing cloth having different characteristics is used in application of the lusterizing composition, wherein the buffing pad or buffing cloth used in application of the polishing composition is stiffer than the buffing pad or buffing cloth used in application of the lusterizing composition.

21. A method as recited in claim 17, wherein the plastic window surface is an aircraft window.

22. A method as recited in claim 17, wherein the plastic surface comprises an automotive plastic light cover, a plastic sunglass lens, or a plastic corrective eyeglass lens.

23. A method for restoring optical clarity and light transmission properties to a plastic surface damaged by scratching and/or UV-induced oxidation, comprising:
providing an abrasive composition initially manufactured and stored in a substantially oxygen-free environment, wherein the abrasive composition is comprised of abrasive particles dispersed within a liquid or gel carrier;
treating the damaged plastic surface to remove scratches and/or UV-induced oxidation by applying the abrasive composition to the plastic surface, wherein the abrasive particles in the abrasive composition initially comprise agglomerates having an initial particle size when initially treating the plastic surface that, when exposed to oxygen and mechanical pressure during use, progressively break down into smaller particles so that the abrasive composition becomes progressively finer and less abrasive during use, wherein the initial and final particle sizes cause the polishing composition to readily remove scratches and oxidation from a plastic surface; and
protecting the treated plastic surface from UV damage by applying to the treated plastic surface at least one UV protective composition to form a UV protective coating on the plastic surface.

24. A method as recited in claim 23, wherein the agglomerates are formulated so as to break down into smaller particles having a final particle size that is less than about 75% of the initial particle size.

25. A method as recited in claim 23, wherein the agglomerates are formulated so as to break down into smaller particles having a final particle size that is less than about 50% of the initial particle size.

* * * * *

UNITED STATES PATENT AND TRADEMARK OFFICE
CERTIFICATE OF CORRECTION

| | |
|---|---|
| PATENT NO. | : 8,580,346 B2 |
| APPLICATION NO. | : 13/080202 |
| DATED | : November 12, 2013 |
| INVENTOR(S) | : Norville |

It is certified that error appears in the above-identified patent and that said Letters Patent is hereby corrected as shown below:

In the Specification

Column 2
Line 57, change "at 2,400 grit" to --at 2,400 gauge grit--

Column 3
Line 20, change "render the window to thin" to --render the window too thin--

Column 8
Line 25, change "scratched region 12" to --damaged region 12--

Column 9
Line 6, change "oxidation, comprising" to --oxidation--

Column 11
Line 61, change "have only a relatively short" to --only have a relatively short--

Column 12
Line 14, change "glass fibers allows" to --glass fibers allow--

Column 17
Line 51, change "corrective lenses." to --corrective lenses).--

Column 21
Line 10, change "lenses." to --lenses).--
Line 16, change "remaining constituents as required" to --remaining constituents can be made as required--
Line 41, change "abrasive compositions" to --abrasive composition--

Signed and Sealed this
Fourth Day of February, 2014

Michelle K. Lee
*Deputy Director of the United States Patent and Trademark Office*